(12) United States Patent
Ochi et al.

(10) Patent No.: US 7,975,275 B2
(45) Date of Patent: Jul. 5, 2011

(54) OBJECT LENS ACTUATOR AND DISC DRIVE USING THE SAME

(75) Inventors: Manabu Ochi, Fujisawa (JP);
Katsuhiko Kimura, Kasumigaura (JP);
Ryuichiro Mizuno, Fujisawa (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 792 days.

(21) Appl. No.: 12/014,123

(22) Filed: Jan. 15, 2008

(65) Prior Publication Data
US 2008/0172685 A1 Jul. 17, 2008

(30) Foreign Application Priority Data
Jan. 17, 2007 (JP) .................. 2007-007585

(51) Int. Cl.
*G11B 7/09* (2006.01)
(52) U.S. Cl. ..................................... 720/681
(58) Field of Classification Search .......... 720/681, 720/683, 689, 600, 675, 660, 672
See application file for complete search history.

(56) References Cited

U.S. PATENT DOCUMENTS

| | | | |
|---|---|---|---|
| 6,657,944 B2 * | 12/2003 | Mohri et al. | 720/681 |
| 7,203,136 B2 * | 4/2007 | Chong et al. | 369/44.15 |
| 2001/0024407 A1 * | 9/2001 | Kunimatsu et al. | 369/13 |
| 2002/0021631 A1 * | 2/2002 | Yokohama et al. | 369/44.16 |
| 2003/0012119 A1 * | 1/2003 | Hori et al. | 369/244 |
| 2004/0128679 A1 * | 7/2004 | Wade | 720/681 |

FOREIGN PATENT DOCUMENTS
JP 8-194962 7/1996
* cited by examiner

*Primary Examiner* — Allen T Cao
(74) *Attorney, Agent, or Firm* — Antonelli, Terry, Stout & Kraus, LLP

(57) ABSTRACT

The present invention has an object to provide an object lens actuator that reduces the amplitude of vibration of an object lens related to a torsional vibration of a lens holder and to enable a disc drive using the same to record information on a disc at high speeds. The above object has been achieved by placing the thickest one of the four walls, which are in an envelope of two opening portions provided in the lens holder and which are perpendicular to a flat plate between the two opening portions, in a position which is opposite to the object lens with respect to the center line between a first support member and a second support member which resiliently support the lens holder therebetween and which is opposite to the object lens with respect to the flat plate.

5 Claims, 8 Drawing Sheets

LEGEND

● : (THICKNESS OF WALL 732d) : (THICKNESS OF WALL 732c) = 1.0

△ : (THICKNESS OF WALL 732d) : (THICKNESS OF WALL 732c) = 1.2

◆ : (THICKNESS OF WALL 732d) : (THICKNESS OF WALL 732c) = 1.3

□ : (THICKNESS OF WALL 732d) : (THICKNESS OF WALL 732c) = 1.4

(THICKNESS OF WALL 732a) : (THICKNESS OF WALL 732b)

OBJECT LENS ACTUATOR AND DISC DRIVE USING THE SAME

BACKGROUND OF THE INVENTION

1. Field of the Invention

The present invention relates to an object lens actuator which drives an object lens for focusing light on a recording surface of an optical disc in focusing and tracking directions so as to reproduce information recorded on the recording surface of the optical disc or record information thereon and to a disc drive using the same.

2. Background Art

A disc drive for recording information on a disc-like information recording medium or reproducing the recorded information is designed to increase the data transfer rate by rotating an optical disc at high speeds. The disc drive includes an object lens actuator which drives an object lens in focusing and tracking directions so as to accurately record or reproduce information by following the rotation of the optical disc.

A general object lens actuator comprises: a magnetic circuit having a yoke and a permanent magnet; a movable portion to which an object lens is attached; a fixing portion for holding the movable portion; and first and second support members which are connected to the fixing portion and resiliently support the movable portion. The object lens is disposed on a center line between the first support member and the second support member. Additionally, a focusing coil and a tracking coil are attached to a flat plate between the two opening portions disposed in the movable portion. When current is supplied to the focusing coil, the movable portion is driven in a focusing direction by an electromagnetic force generated by an effect of magnetic flux from a permanent magnet attached to the yoke. Likewise, when current is supplied to the tracking coil, the movable portion is driven in a tracking direction by an electromagnetic force generated by an effect of magnetic flux from a permanent magnet attached to the yoke (see JP Patent Publication (Kokai) No. 8-194962 (1996)(FIG. 1)).

Such an object lens actuator needs to enhance the control band for focusing and tracking with an increased number of rotations of the optical disc so as to position the object lens in focusing and tracking directions. To provide a stable control, the amplitude in a higher order resonance frequency of the object lens actuator needs to be small.

There is a torsional vibration of the lens holder as a higher order resonance of the object lens actuator. According to the conventional technique, when the object lens are placed symmetrically with respect to the center line between the first support member and the second support member which resiliently support the lens holder therebetween respectively, the object lens actuator is hard to be subject to torsional vibration. However, when the object lens are biased toward the inner periphery with respect to the center line, viewed from an optical axial direction of the object lens and between the support members which resiliently support the lens holder therebetween, so as to enable access to a data area provided at the inner periphery of an optical disc, the object lens actuator may have a problem in that when torsional vibration of the lens holder occurs, the position of the object lens serves as a vibration loop which may increase the amplitude thereof.

SUMMARY OF THE INVENTION

The present invention has been made in view of the aforementioned problems related to torsional vibration of a lens holder, and has an object to provide an object lens actuator that reduces the amplitude of vibration of an object lens and to enable a disc drive using the same to record information on a disc at high speeds.

The above object has been achieved by placing the thickest wall of the four walls, which are in an envelope of two opening portions provided in the lens holder and which are perpendicular to a flat plate between the two opening portions, in a position which is in the opposite side to the object lens with respect to the center line between a first support member and a second support member which resiliently support the lens holder therebetween and which is in the opposite side to the object lens with respect to the flat plate.

According to the present invention, in a mode of the torsional vibration of the lens holder, the mode components of each coil generating a driving force can be equal in magnitude and opposite in direction. As a result, the driving forces generated in each coil are the same, and thus the product of a driving force of each coil and a mode component of a torsional vibration is offset with each other, thereby minimizing the amplitude at a position of the object lens due to a torsional vibration of the lens holder.

As described above, the present invention can provide an object lens actuator that reduces the amplitude at the position of an object lens related to a torsional vibration of a lens holder, and a disc drive using the same capable of recording information on a disc at high speeds.

DETAILED DESCRIPTION OF THE PREFERRED EMBODIMENTS

Hereinafter, the preferred embodiments of the present invention will be described with reference to the drawings.

First Embodiment

Figure 11:
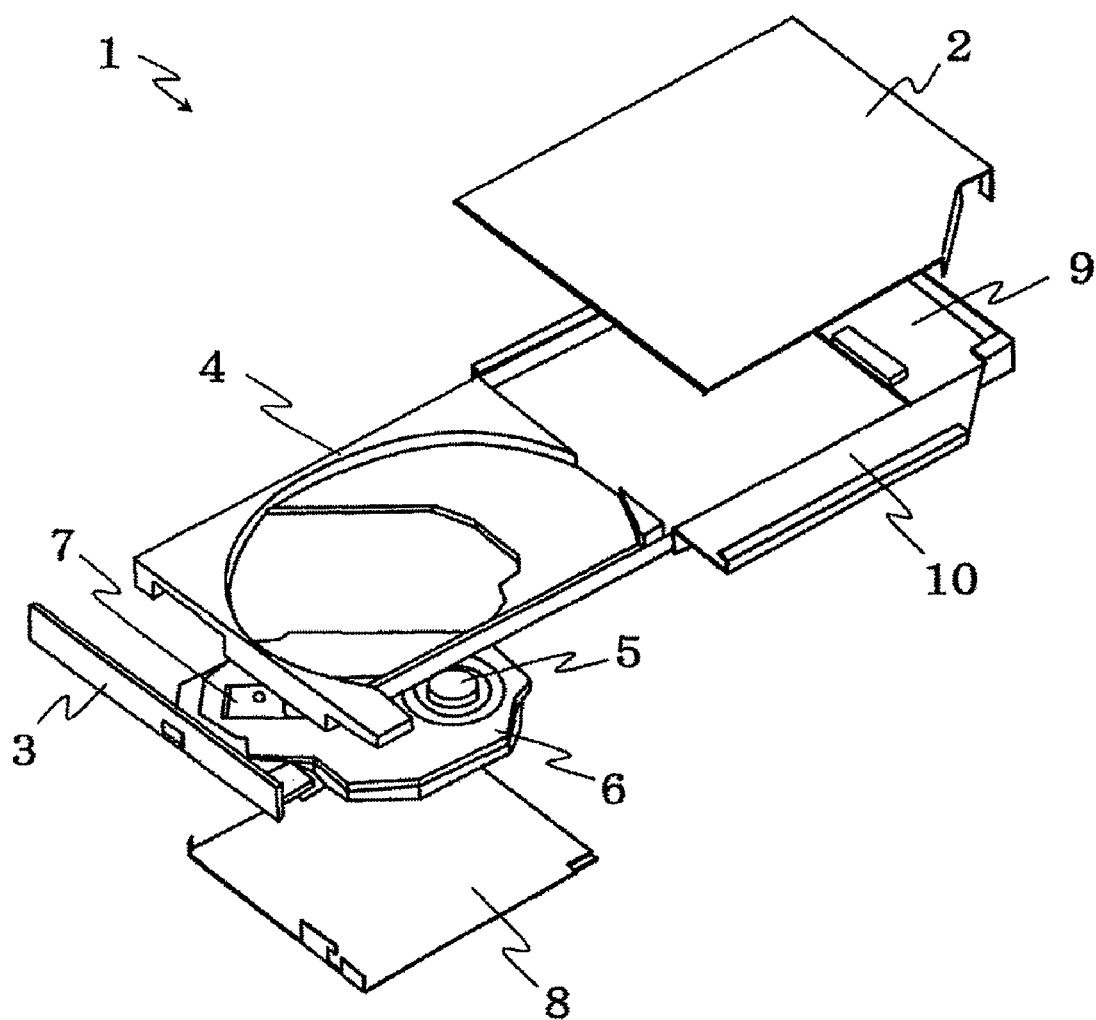
FIG. 11 is an exploded perspective view of a disc drive to which the object lens actuator of the present invention is applied.

FIG. 11 is an exploded perspective view of the disc drive 1 to which the object lens actuator 73 of the present invention is applied. In the figure, the disc drive 1 mainly includes a bottom case 10, a disk tray 4 for retracting a disc serving as an information recording means into the apparatus or ejecting the disc outside the apparatus, and a circuit board 9 having semiconductor components for performing drive control and signal processing on electronic components mounted inside the disc drive. A top case 2 is installed on the top surface of the bottom case 10 and a front panel 3 is installed on the front surface of the bottom case 10. As a result, the top surface and front surface of the bottom case 10 are covered with the top case 2 and the front panel 3.

A unitized mechanical portion (hereinafter referred to as a unit mechanism) 6 is attached to the disc tray 4, the undersurface of which is covered with an undercover 8. The unit mechanism 6 includes a spindle motor 5 for rotating a disc, an optical head 7 for recording or reproducing information on and from the disc, and an optical head feeding mechanism for moving optical head 7 in a radial direction of the disc along a guide shaft (not shown).

Figure 10:
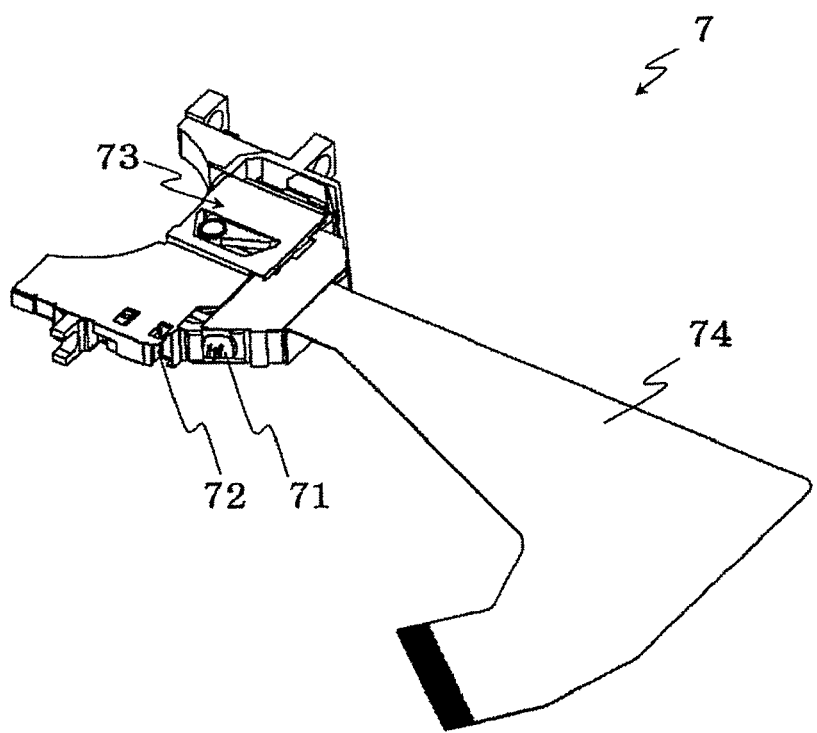
FIG. 10 is a perspective view of an optical head to which the object lens actuator of the present invention is applied.

FIG. 10 is a perspective view of an optical head 7 to which the object lens actuator 73 of the present invention is applied. In the figure, the optical head 7 is mainly composed of three components: an object lens actuator 73, an optical system, and a flexible printed circuit board 74. The object lens actuator 73 is configured to drive the object lens in focusing and tracking directions to accurately record or reproduce information by following a track on a disc. The optical system includes a semiconductor laser diode 71 for emitting a laser beam, a lens and a mirror (not shown) for branching light from the semiconductor laser diode and focusing light on the disc, a photo detector 72 for receiving reflected light from the disc. The flexible printed circuit board 74 electrically connects the object lens actuator 73 and the optical system to the circuit board 9 by a plurality of wiring patterns.

Figure 1:
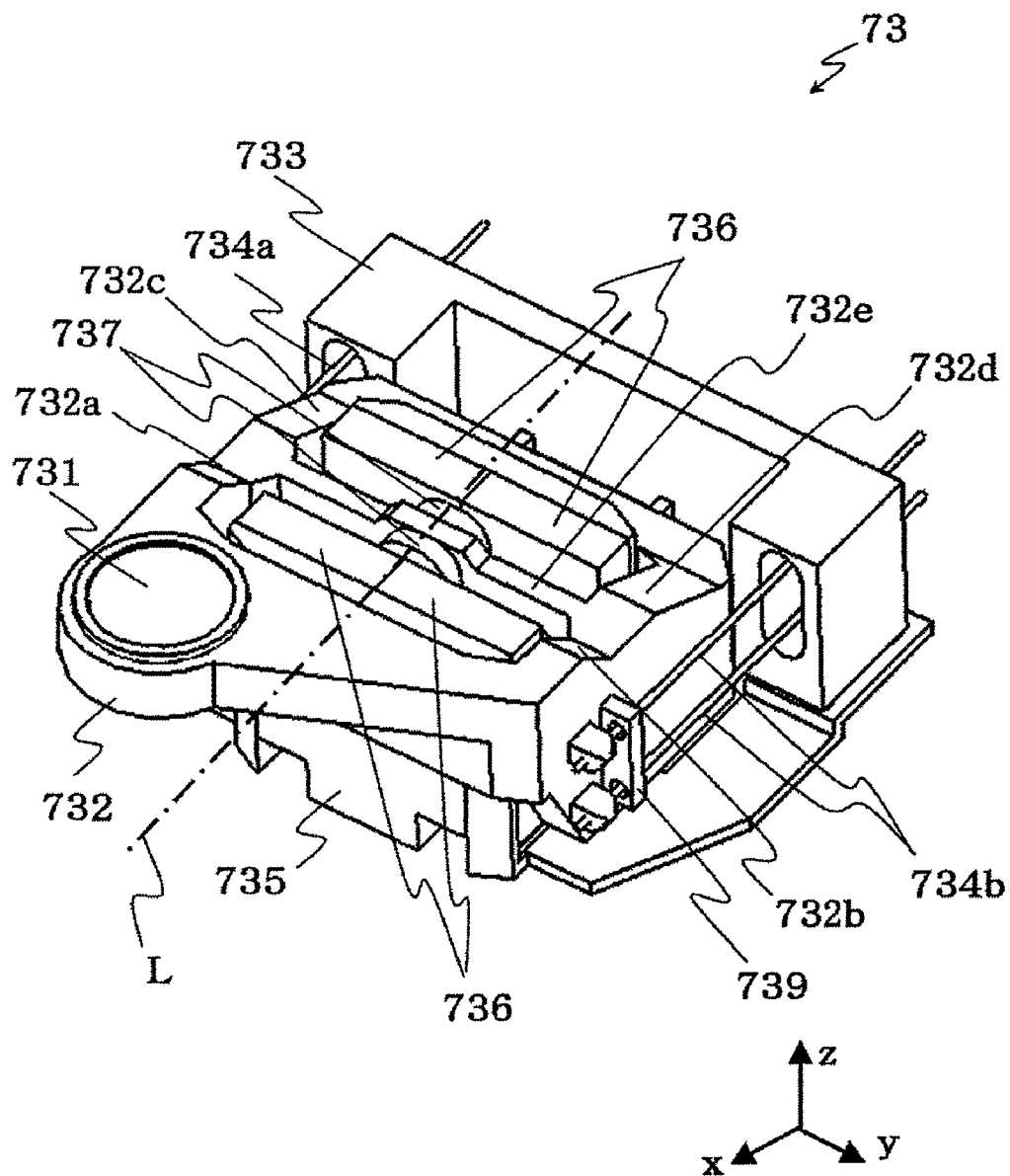
FIG. 1 is a perspective view of the object lens actuator in accordance with an embodiment of the present invention.

FIG. 1 is a perspective view of the object lens actuator 73 of the present invention. In the figure, the x-axis direction shows a tangential direction of an optical disc (not shown), the y-axis direction shows a tracking direction, i.e., a radial direction of the optical disc, and the z-axis direction shows a focusing direction, i.e., an optical axis direction of the object lens 731. The object lens actuator 73 includes a movable portion to which the object lens 731 is attached, a fixing portion 733 for holding this movable portion, a first support member 734a and a second support member 734b which are connected to the fixing portion 733 and resiliently support the movable portion, and a magnetic circuit having a yoke 735 and a permanent magnet 736.

One end of the wire shaped first support member 734a and the wire shaped second support member 734b is fixed near an end surface of the fixing portion 733 and the other end thereof is fixed by solder and the like to each of the projecting portions 739 which are disposed at both sides of the lens holder 732.

The object lens 731 is disposed asymmetrically with respect to the center line L between the first support member 734a and the second support member 734b. The lens holder 732 is provided with two opening portions. A tracking coil 737 and focusing coils 738a, 738b, 738c and 738d (not shown) are attached to the both ends of the flat plate 732e between the two opening portions.

Then, the object lens 731, the lens holder 732, the tracking coil 737, and the focusing coils 738a, 738b, 738c and 738d are configured to form the movable portion. In other words, this movable portion is configured to move with respect to the fixing portion 733.

Figure 9:
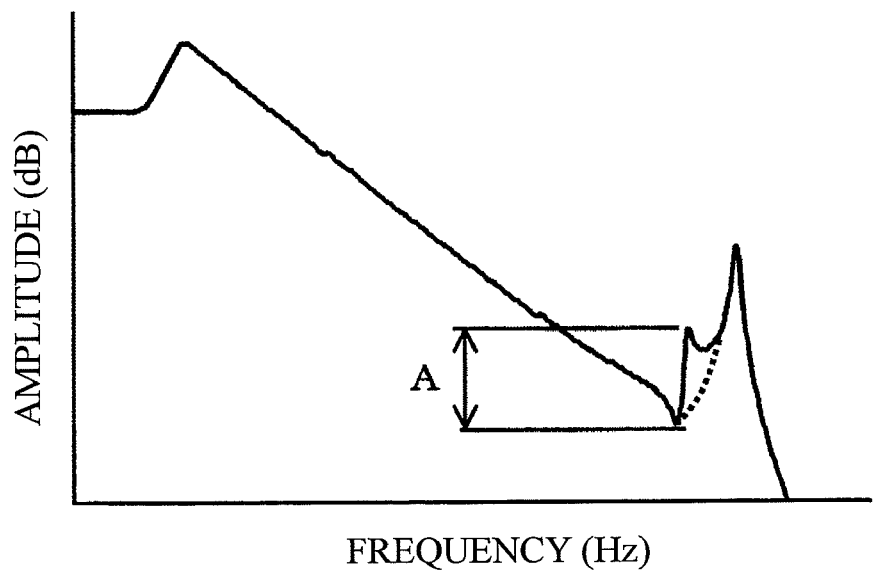
FIG. 9 is a diagrammatic drawing showing a frequency response of displacement in a focusing direction of the object lens.

Here, the torsional vibration of the lens holder 732 is apt to be excited when a driving force is generated in the focusing coils 738a, 738b, 738c and 738d of the movable portion. FIG. 9 is a diagrammatic drawing showing a frequency response of displacement in a focusing direction of the object lens 731 when a driving force is generated in the focusing coils 738a, 738b, 738c and 738d. In the figure, the symbol A denotes the amount of increase in amplitude of the object lens 731 due to a torsional vibration of the lens holder 732. The amount of increase in amplitude A of the object lens 731 due to this torsional vibration is obtained by adding the product of the mode component of a torsional vibration of the object lens 731, the driving force of a torsional vibration of the focusing coil, and the mode component of a torsional vibration of the focusing coil, each of which is calculated for each of the focusing coils 738a, 738b, 738c and 738d.

Accordingly, all that is needed to reduce the amount of increase in amplitude A of the object lens 731 due to this torsional vibration is to make the mode component of a torsional vibration of each of the focusing coils 738a, 738b, 738c and 738d equal in magnitude and opposite in direction.

Here, the positional relationship of the four walls 732a, 732b, 732c, and 732d which are part of an envelope of the two opening portions of the lens holder 732 and which are perpendicular to the flat plate 732e between the two opening portions will be described with reference to FIG. 2. The wall 732a is positioned in the same side as the object lens 731 with respect to the center line L between the first support member 734a and the second support member 734b and is positioned in the same side as the object lens 731 with respect to the flat plate 732e. The wall 732b is positioned in the opposite side to the object lens 731 with respect to the center line L and is positioned in the same side as the object lens 731 with respect to the flat plate 732e. The wall 732c is positioned in the same side as the object lens 731 with respect to the center line L and is positioned in the opposite side to the object lens 731 with respect to the flat plate 732e. The wall 732d is positioned in the opposite side to the object lens 731 with respect to the center line L and is positioned in the opposite side to the object lens 731 with respect to the flat plate 732e.

Figure 2:
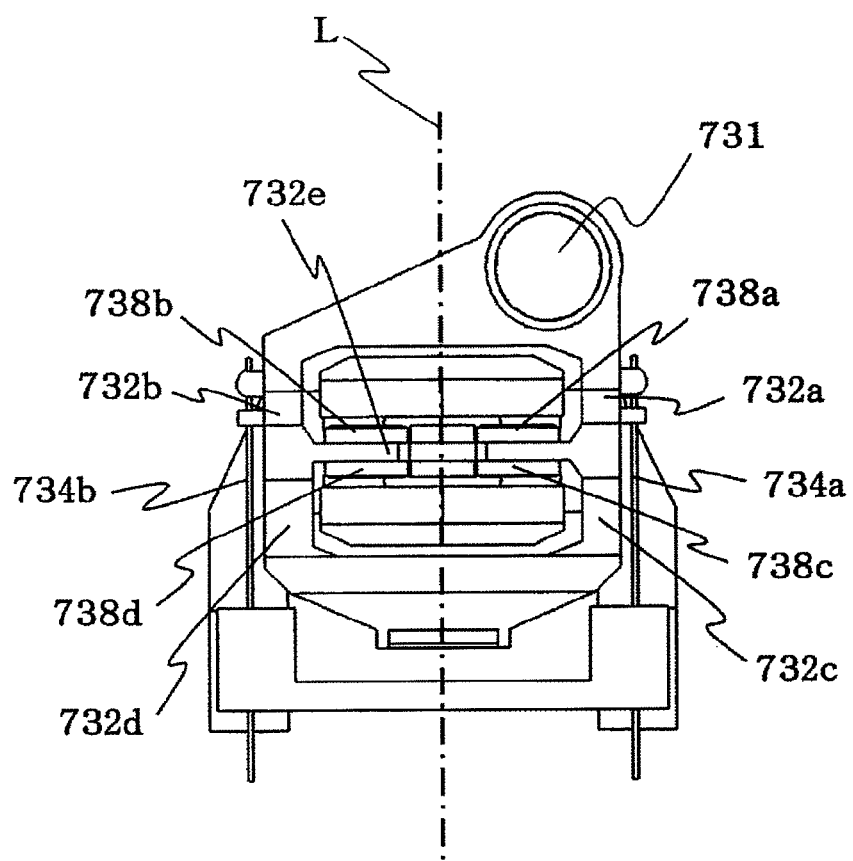
FIG. 2 is a top view of the object lens actuator in accordance with an embodiment of the present invention.
Figure 3:
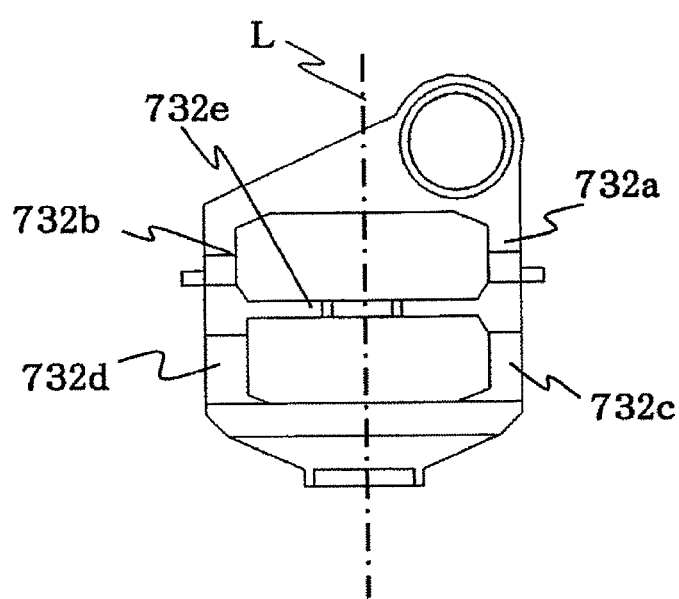
FIG. 3 is a top view of the lens holder in accordance with an embodiment of the present invention.

Within the above guidelines, according to the present embodiment, as shown in FIGS. 2 and 3, the wall 732d is configured to be thickest of the four walls 732a, 732b, 732c, and 732d of the lens holder 732. In this case, the mode components of the torsional vibration of the two pairs of focusing coils 738a, 738b, 738c, and 738d disposed symmetrically with respect to the center line L are equal in magnitude but the direction of the mode components of the torsional vibration of the focusing coils 738a and 738c and that of the focusing coils 738b and 738d are opposite to one another on either side of the center line L. Accordingly, the amount of increase in amplitude A of the object lens 731 due to a torsional vibration can be minimized.

Figure 4:
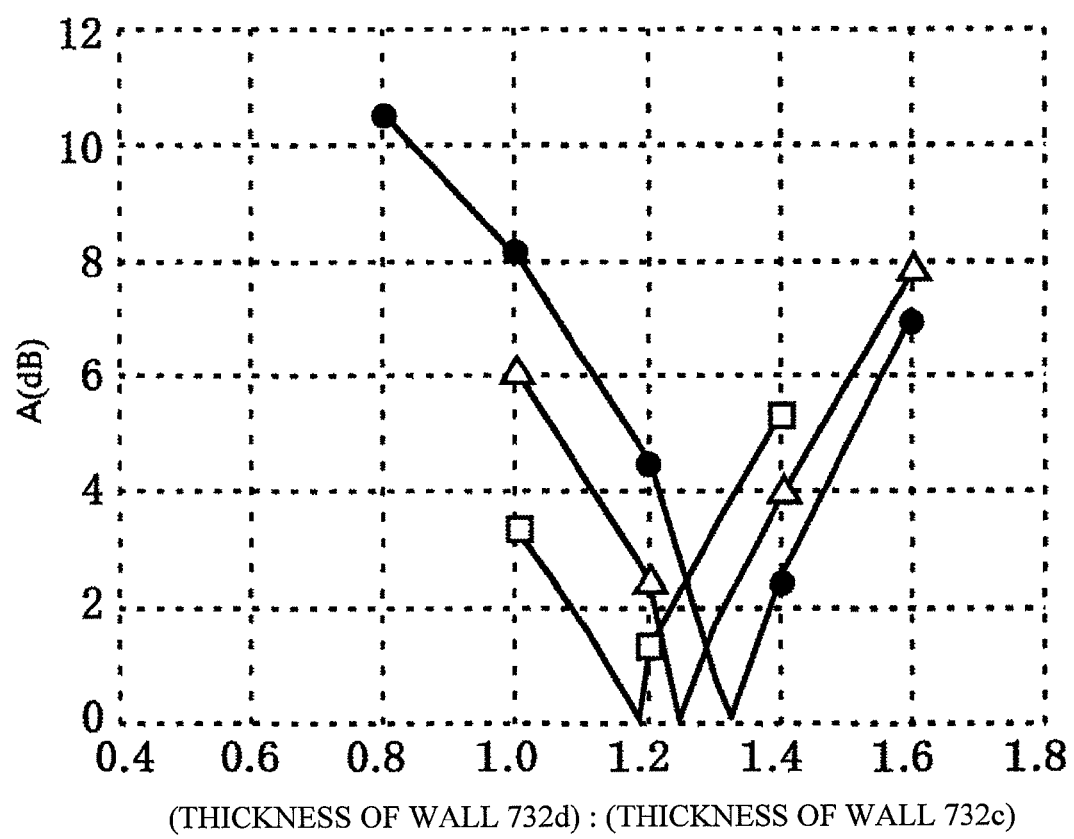
FIG. 4 is a graph showing an advantage of an embodiment of the present invention.

This advantage is shown as the legend by a black filled circle in FIG. 4.

The legend of black filled circles indicate the amount of increase in amplitude A of the object lens 731 due to a torsional vibration of the lens holder 732 is plotted by changing from the state (FIG. 8) in which the four walls 732a, 732b, 732c, and 732d are as thick as 1.0 mm to the state (FIG. 3) in which the thickness of the wall 732d of the four walls is changed from 0.8 mm to 1.6 mm. The abscissa indicates the thickness of the wall 732d as a ratio of thickness between the walls 732d and 732c. In FIG. 4, it can be seen that the larger the value of the abscissa, the thicker the wall 732d. When the ratio of thickness between the walls 732d and 732c is approximately 1.3, the amount of increase in amplitude A of the object lens 731 can be approximately zero. At this time, the ratio of thickness of the four walls (thickness of wall 732a): (thickness of wall 732b): (thickness of wall 732c): (thickness of wall 732d) becomes approximately 1:1:1:1.3, which means the wall 732d is the thickest.

Figure 8:
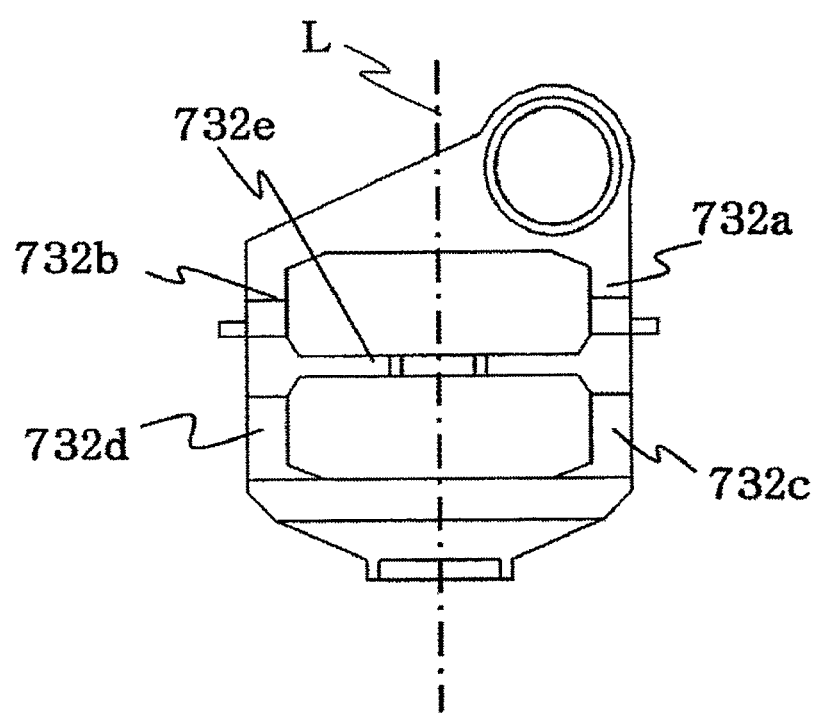
FIG. 8 is a top view of a conventional lens holder.

FIG. 4 further includes the legend of an open triangle and an open box which indicate the results of a change in ratio of thickness between the wall 732d and the wall 732c by increasing or decreasing the thickness of the wall 732d in a state where the thickness of the wall 732a is increased in a range from 1.0 mm to 1.4 mm from the state of FIG. 8 and the ratio of thickness between the wall 732a and the wall 732b is fixed as either 1.2 or 1.4. This results indicate that at least in a range where the ratio of thickness between the wall 732a and the wall 732b is between 1.0 and 1.2, making the ratio of thickness between the wall 732d and the wall 732c more than 1.2 and at the same time making the ratio of thickness between the wall 732a and the wall 732b more than 1.0 and equal to or less than 1.2 can suppress the amount of increase in amplitude A of the object lens 731 to approximate zero in a condition where the ratio of thickness between the wall 732d and the wall 732c is nearer to 1.0, as compared to increasing only the ratio of thickness between the wall 732d and the wall 732c. In other words, as compared to increasing the thickness of the wall 732d only, increasing the thickness of the wall 732a as well can decrease the thickness of the wall 732d. In this case, asymmetric diversity of the two opening portions with respect to the center line L and the flat plate 732e can be minimized, and thus the focusing coils 738a, 738b, 738c, and 738d can be increased in width, thereby increasing the driving force of the object lens actuator 73.

Second Embodiment

Figure 5:
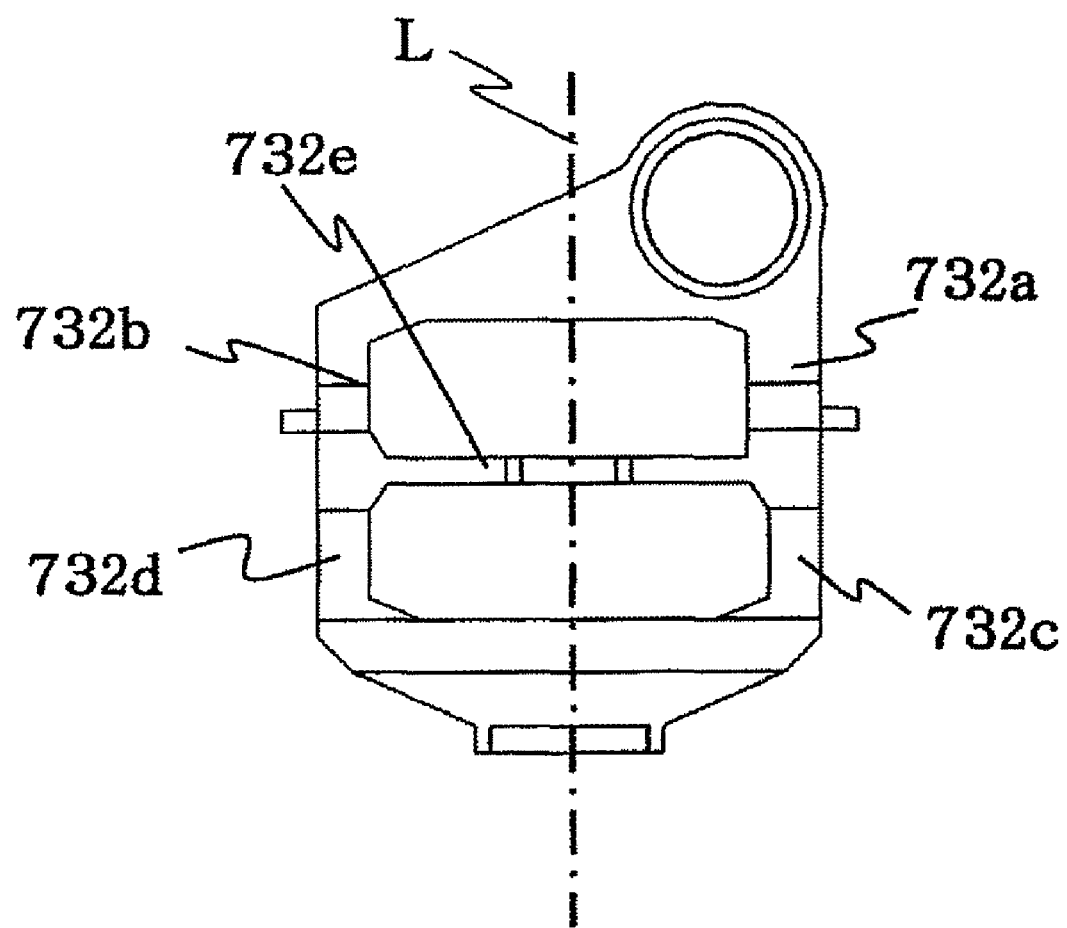
FIG. 5 is a top view of the lens holder in accordance with an embodiment of the present invention.

FIG. 5 is a top view of the lens holder 732 of the object lens actuator 73 in accordance with a second embodiment of the present invention. According to the second embodiment, the wall 732a is configured to be the thickest of the four walls 732a, 732b, 732c, and 732d. The detailed proofs thereof are omitted since the other configurations of the second embodiment are the same as those of the first embodiment. In these configurations, like the first embodiment, the mode components of the torsional vibration of the two pairs of the focusing coils 738a, 738b, 738c, and 738d disposed symmetrically with respect to the center line L are equal in magnitude, but the direction of the mode components of the torsional vibration of the focusing coils 738a and 738c and that of the focusing coils 738b and 738d are opposite to one another on either side of the center line L. Accordingly, the amount of increase in amplitude A of the object lens 731 due to a torsional vibration can be minimized. This advantage is shown as the legend by a black filled circle in FIG. 6.

Figure 6:
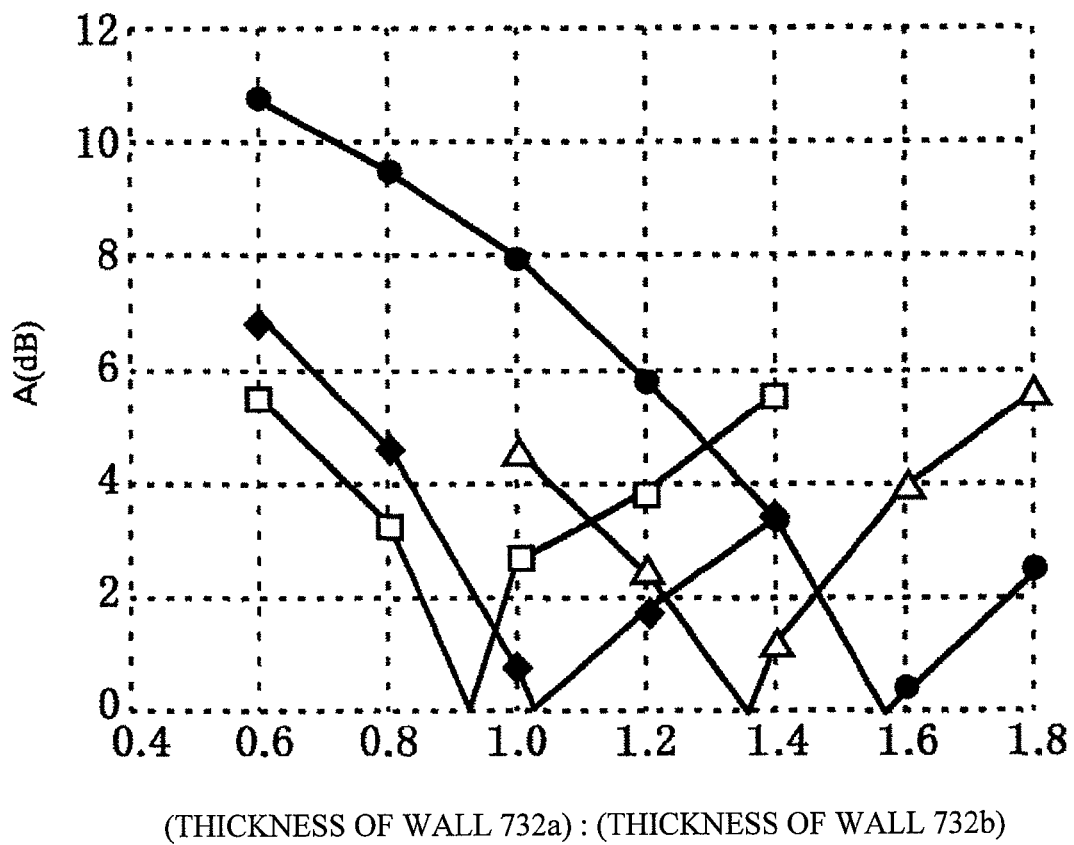
FIG. 6 is a graph showing an advantage of an embodiment of the present invention.

The legend of black filled circles indicate the amount of increase in amplitude A of the object lens 731 due to a torsional vibration of the lens holder 732 is plotted by changing from the state (FIG. 8) in which the four walls 732a, 732b, 732c, and 732d are as thick as 1.0 mm to the state (FIG. 5) in which the thickness of the wall 732a of the four walls is changed from 0.6 mm to 1.8 mm. The abscissa indicates the thickness of the wall 732a as a ratio of thickness between the walls 732a and 732b. In FIG. 6, the larger the value of the horizontal axis, the thicker the wall 732a. When the ratio of thickness between the walls 732a and 732b is approximately 1.6, the amount of increase in amplitude A of the object lens 731 can be approximately zero. At this time, the ratio of thickness of the four walls (thickness of wall 732a): (thickness of wall 732b): (thickness of wall 732c): (thickness of wall 732d) becomes approximately 1.6:1:1:1, which means the wall 732a is the thickest.

FIG. 6 further includes the legend of an open triangle, a filled rhombus, and an open box which indicate the results of a change in ratio of thickness between the wall 732a and the wall 732b by increasing or decreasing the thickness of the wall 732a in a state where the thickness of the wall 732d is increased in a range from 1.0 mm to 1.4 mm starting with FIG. 8 and the ratio of thickness between the wall 732d and the wall 732c is fixed as any one of 1.2, 1.3, and 1.4. This results indicate that at least in a range where the thickness of the wall 732d is in a range from 1.0 to 1.2, making the ratio of thickness between the wall 732a and the wall 732b more than 1.2 and at the same time making the ratio of thickness between the wall 732d and the wall 732c more than 1.0 or equal to or less than 1.2 can suppress the amount of increase in amplitude A of the object lens 731 to approximately zero in a condition where the ratio of thickness between the wall 732a and the wall 732b is nearer to 1.0, as compared to increasing only the ratio of thickness between the wall 732a and the wall 732b. In other words, as compared to increasing the thickness of the wall 732a only, increasing the thickness of the wall 732d as well can decrease the thickness of the wall 732a. Accordingly, asymmetric diversity of the two opening portions with respect to the center line L and the flat plate 732e can be minimized, and thus the focusing coils 738a, 738b, 738c, and 738d can be widened, thereby increasing the driving force of the object lens actuator 73.

Third Embodiment

Figure 7:
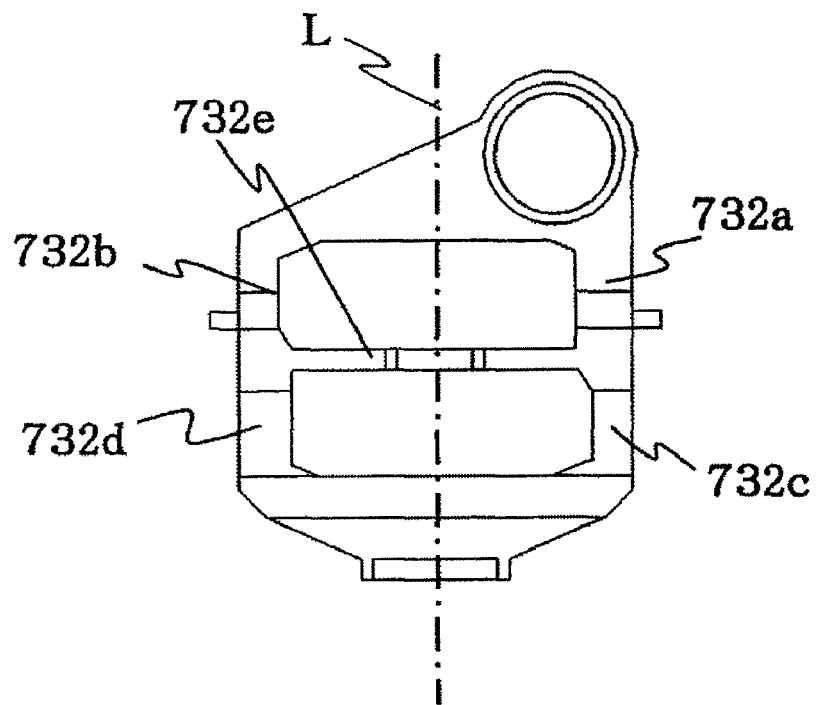
FIG. 7 is a top view of the lens holder in accordance with an embodiment of the present invention.

FIG. 7 is a top view of the lens holder 732 of the object lens actuator 73 in accordance with a third embodiment of the present invention. According to the third embodiment, of the four walls 732a, 732b, 732c, and 732d, the wall 732a is as thick as the wall 732d, the walls 732a and 732d are thicker than the remaining two walls 732b and 732c.

The detailed proofs thereof are omitted since the other configurations of the third embodiment are the same as those of the first and the second embodiments. In these configurations, like the first and second embodiments, the mode components of the torsional vibration of the two pairs of the focusing coils 738a, 738b, 738c, and 738d disposed symmetrically with respect to the center line L can be equal in magnitude, but the direction of the mode components of the torsional vibration of the focusing coils 738a and 738c and that of the focusing coils 738b and 738d can be opposite to one another on either side of the center line L. Accordingly, the amount of increase in amplitude A of the object lens 731 due to a torsional vibration can be minimized. Further, according to the present embodiment, the two opening portions can be equal in size. Accordingly, the permanent magnet 736 disposed in the opening portion, focusing coils 738a, 738b, 738c, 738d, and the tracking coil 737 attached to the flat plate 732e can be the same in shape and magnitude.

Accordingly, the present invention allows an object lens actuator and disc drive using the same to increase the speed of recording information on a disc.

What is claimed is:
1. An object lens actuator comprising:
a lens holder for holding an object lens;
a fixing portion for holding the lens holder; and
first and second support members which are connected to the fixing portion and resiliently support the lens holder therebetween,
wherein the lens holder has two opening portions for disposing a permanent magnet respectively,
wherein the object lens actuator has four walls which are in the envelope of the two opening portions and which are perpendicular to a flat plate between the two opening portions, wherein the object lens is disposed asymmetrically with respect to the center line between the first support member and the second support member, wherein one of the four walls, which is in the opposite side to the object lens with respect to the center line and which is in the opposite side to the object lens with respect to the flat plate, is configured to be the thickest, and wherein one of the four walls, which is in the same side as the object lens with respect to the center line and which is in the same side as the object lens with respect to the flat plate, is thicker than a wall which is in the opposite side to the object lens with respect to the center line and which is in the same side as the object lens with respect to the flat plate.

2. The object lens actuator according to claim 1 wherein, of the four walls, the ratio of thickness between a wall which is in the opposite side to the object lens with respect to the center line and which is in the opposite side to the object lens with respect to the flat plate and a wall which is in the same side as the object lens with respect to the center line and which is in the opposite side to the object lens with respect to the flat plate is more than 1.2; and the ratio of thickness between a wall which is in the same side as the object lens with respect to the center line and which is in the same side as the object lens with respect to the flat plate and a wall which is in the opposite side to the object lens with respect to the center line and which is in the same side as the object lens with respect to the flat plate is more than 1.0 and equal to or less than 1.2.

3. An object lens actuator comprising:

a lens holder for holding an object lens;

a fixing portion for holding the lens holder; and first and second support members which are connected to the fixing portion and resiliently support the lens holder therebetween, wherein the lens holder has two opening portions for disposing a permanent magnet respectively, wherein the object lens actuator has four walls which are in the envelope of the two opening portions and which are perpendicular to a flat plate between the two opening portions, wherein the object lens is disposed asymmetrically with respect to the center line between the first support member and the second support member, wherein one of the four walls which is in the same side as the object lens with respect to the center line and which is in the same side as the object lens with respect to the flat plate, is configured to be the thickest, and wherein one of the four walls, which is in the opposite side to the object lens with respect to the center line and which is in the opposite side to the object lens with respect to the flat plate, is thicker than a wall which is in the same side as the object lens with respect to the center line and which is in the opposite side to the object lens with respect to the flat plate.

4. The object lens actuator according to claim 3 wherein, of the four walls, the ratio of thickness between a wall which is in the same side as the object lens with respect to the center line and which is in the same side as the object lens with respect to the flat plate and a wall which is in the opposite side to the object lens with respect to the center line and which is in the same side as the object lens with respect to the flat plate is more than 1.2, and the ratio of thickness between a wall which is in the opposite side to the object lens with respect to the center line and which is in the opposite side to the object lens with respect to the flat plate and a wall which is in the same side as the object lens with respect to the center line and which is in the opposite side to the object lens with respect to the flat plate is more than 1.0 and equal to or less than 1.2.

5. A disc drive using the object lens actuator according to one of claims 1, 2, 3, and 4.

* * * * *